J. W. THIE.
WHIP OPERATING DEVICE.
APPLICATION FILED FEB. 25, 1914.

1,112,340.

Patented Sept. 29, 1914.
2 SHEETS—SHEET 1.

Fig. 1.

Witnesses
F. C. Gibson.
J. F. Byrne

Inventor
John W. Thie.
By Victor J. Evans
Attorney

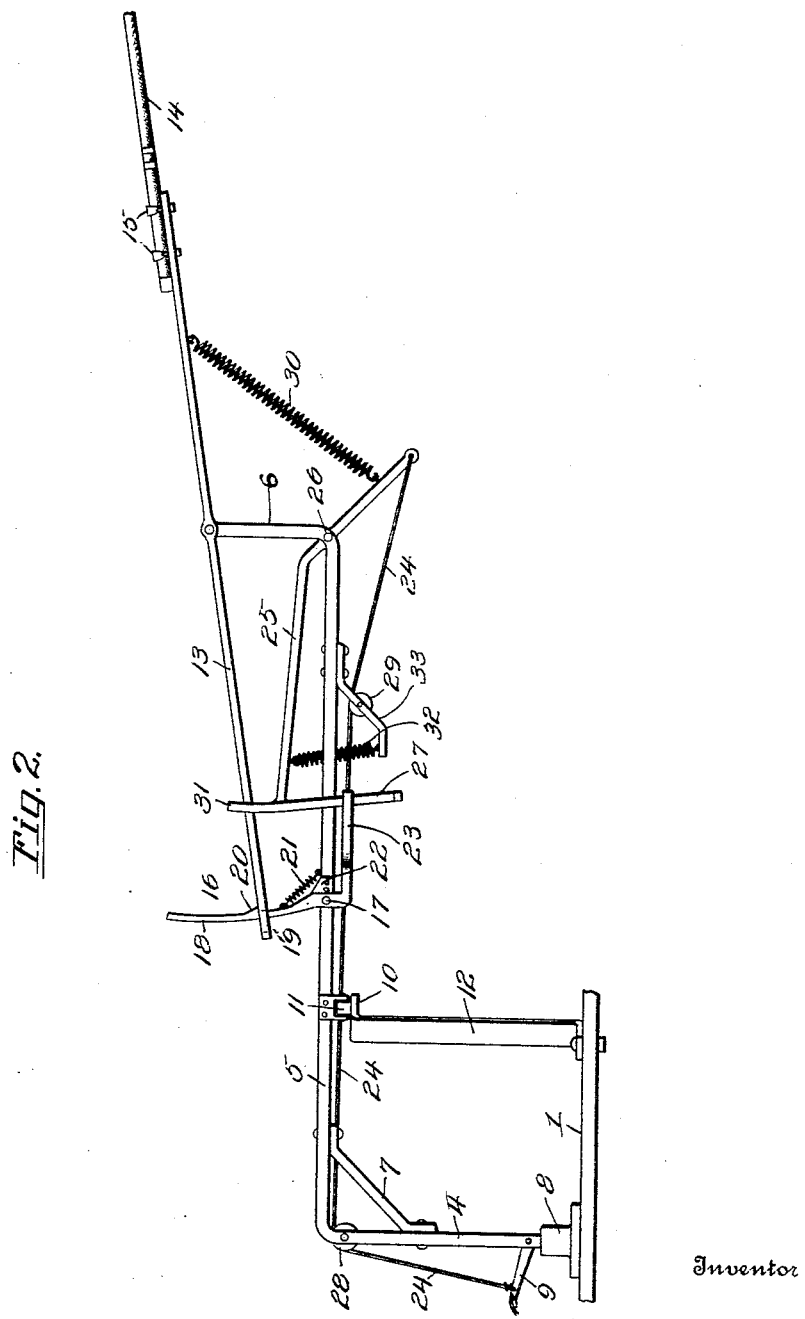

UNITED STATES PATENT OFFICE.

JOHN W. THIE, OF MEDIAPOLIS, IOWA.

WHIP-OPERATING DEVICE.

1,112,340.   Specification of Letters Patent.   Patented Sept. 29, 1914.

Application filed February 25, 1914. Serial No. 820,983.

*To all whom it may concern:*

Be it known that I, JOHN W. THIE, a citizen of the United States, residing at Mediapolis, in the county of Des Moines and State of Iowa, have invented new and useful Improvements in Whip-Operating Devices, of which the following is a specification.

My invention relates to improvements in whip operating devices, and one of its objects is the provision of a device of this character especially adapted for use on harvesters and other agricultural machines usually drawn by two or more horses, the invention comprehending a device which may be operated by one foot of the driver and by means of which the driver may position and operate the whip over any horse of the team.

A further object of the invention is the provision of a whip operating device wherein the whip shall be held against accidental movement and wherein the blow of the whip shall be substantially similar to that of a hand-operated whip.

A still further object of the invention is the provision of a whip operating device which shall be simple, durable, and efficient, and which may be manufactured and sold at a comparatively low cost.

With the above and other objects in view, the invention consists in the construction, combination, and arrangement of parts hereinafter fully described and claimed, and illustrated in the accompanying drawings, wherein—

Figure 1 is a top plan view illustrating the application of my improved whip operating device, and Fig. 2 is a view in side elevation of the device, parts being broken away.

My improved whip operating device is especially adapted for use on agricultural machines of the type shown in the drawing. The machine is a well-known type of harvester embodying a platform 1, seat 2, and tongue 3.

The whipping device comprises a frame which consists of a vertical standard 4, a horizontal bar 5, which extends forwardly from the upper end of the standard, and a vertical bracket 6 which extends upwardly from the outer free end of the bar. The frame is reinforced by braces 7. The lower end of the standard 4 is journaled in a bearing 8 which is so located on the platform 1 as to position the standard adjacent the seat 2. The journaling of the standard permits the bar 5 to be moved in a horizontal direction from one side to the other of the tongue 3. To permit of this movement of the bar 5 by one foot of the driver, a pedal 9 is pivoted to the standard 4 adjacent its lower end. To prevent the bending of the bar 5, a track 10 is provided and journaled upon the bar for travel in the track is a roller 11. The track 10 is curved on the arc of a circle of which the bearing 8 is the center, and it is mounted upon supports 12 which are secured to the platform 1.

A whip carrying lever 13 is pivotally secured at a point intermediate its ends to the upper end of the bracket 6. A whip is secured to the lever 13 by clips 15, which may be readily and quickly applied and removed so as to permit the renewal of the whip when it becomes worn or is otherwise rendered unfit for use. The lever 13 is held in an upwardly inclined position by an L-shaped latch 16 which is pivoted at 17 to the bar 5. The vertical arm 18 of the latch extends upwardly through an opening 19 in the rear end of the lever 13, and is provided with a lug 20 for engagement with the upper face of the lever. The latch 16 is yieldingly held in active position by a contractile spring 21 which is secured to the bar 5 and arm 18. The upper face of the lug 20 is downwardly inclined so as to permit the automatic latching of the lever 13 in the downward movement of its inner end. A stop 22 is secured to the arm 5 to limit the movement of the latch 16 under the influence of the spring 21. The horizontal arm 23 of the latch is offset with relation to the vertical arm 18 so as to space it from the bar 5.

A means adapted to be operated by the foot of the driver is provided for first releasing the lever 13 and then snapping the whip 14 against one horse of the team. This means comprises the foot pedal 9, a cable 24, and a lever 25, and a contractile spring 30. The lever 25 is pivoted at 26 to the forward end of the bar 5 and is provided with an arm 27 which is adapted to engage the arm 23 and operate the latch 16 when the lever is moved in one direction. The cable 24 is secured at its forward end to the lever 25 and at its rear end to the foot pedal 9, and it passes over supporting pulleys 28 and 29 carried by the bar 5. A downward movement of the foot pedal 9 will operate the lever 23 in such a manner as to move the latch 16 into inoperative position, releasing the whip lever 13. As soon as released the forward end of the whip lever 13 and consequently the whip 14 is given a quick downward movement by the contractile spring 30 which is secured to the levers 13 and 25. The lever 25 is provided with a yoke 31 which straddles the lever 13. When the lever 25 is moved by the contractile spring 32, the lever 13 is so operated as to depress its rear end and elevate the whip 14, which depression brings about the latching of the lever 13. The spring 32 is secured to the lever 25 and to an arm 33 carried by the bar 5. When the lever 25 is in normal position, and when the lever 13 is in latched position, the spring 30 is inoperative, but when the lever 25 is moved in the direction to unlatch the lever 13 this spring is tensioned, so that immediately upon the unlatching of the lever the whip is operated. As soon as the pressure is removed from the pedal 9 the spring 30 again becomes inoperative, and the spring 32 reacts so as to bring the lever 13 into position to be engaged by the latch 16.

It should be apparent from the above description taken in connection with the accompanying drawings, that I provide a whip operating device which may be controlled by one foot of the operator. By means of the device the whip may be positioned and operated over any horse of a team. With one foot upon the pedal 9, the driver may swing the whip 14 over any horse of the team and by a downward pressure upon the lever bring the whip into engagement with the horse. The downward movement of the pedal 9 moves the lever 25 in such a direction that the latch 16 is thrown out of engagement with the lever 13 and the spring 30 is tensioned, whereby immediately upon the releasing of the lever the spring reacts and brings the whip into engagement with the horse. As soon as the downward pressure is removed from the pedal 9, the spring 30 again becomes inactive permitting the elevation of the whip 14 by the spring 32 and the movement of the lever 13 in a direction to be engaged by the latch 16. The device embodies a structure which is simple, durable, and efficient, and which may be manufactured and sold at a comparatively low cost, and which may be used on all types of vehicles.

Having now fully described my invention, what I claim and desire to secure by Letters-Patent is:

1. A whip operating device comprising a journaled standard, a bearing carried by the standard, a supporting track, a bar, a roller mounted upon the bar and traveling on the track, a whip mounted upon the bar, and means for actuating the bar to operate the whip.

2. A whip operating device including a whip carrying lever mounted for horizontal and vertical movement, means for moving the lever horizontally and means for holding the lever against vertical movement, and means for releasing the lever and operating it vertically.

In testimony whereof I affix my signature in presence of two witnesses.

JOHN W. THIE.

Witnesses:
I. F. TALBOTT,
CARL THIE.

Copies of this patent may be obtained for five cents each, by addressing the "Commissioner of Patents, Washington, D. C."